(12) United States Patent
Ravikumar et al.

(10) Patent No.: US 12,481,891 B2
(45) Date of Patent: Nov. 25, 2025

(54) TRAINING NEURAL NETWORKS WITH LABEL DIFFERENTIAL PRIVACY

(71) Applicant: Google LLC, Mountain View, CA (US)

(72) Inventors: Shanmugasundaram Ravikumar, Piedmont, CA (US); Badih Ghazi, San Jose, CA (US); Pasin Manurangsi, Mountain View, CA (US); Chiyuan Zhang, Mountain View, CA (US); Noah Golowich, Lexington, MA (US)

(73) Assignee: Google LLC, Mountain View, CA (US)

( * ) Notice: Subject to any disclaimer, the term of this patent is extended or adjusted under 35 U.S.C. 154(b) by 1039 days.

(21) Appl. No.: 17/511,448

(22) Filed: Oct. 26, 2021

(65) Prior Publication Data

US 2022/0129760 A1 Apr. 28, 2022

Related U.S. Application Data

(60) Provisional application No. 63/105,776, filed on Oct. 26, 2020.

(51) Int. Cl.
*G06N 3/08* (2023.01)
*G06N 3/084* (2023.01)

(52) U.S. Cl.
CPC .................. *G06N 3/084* (2013.01)

(58) Field of Classification Search
None
See application file for complete search history.

(56) References Cited

U.S. PATENT DOCUMENTS

| 10,621,379 | B1 * | 4/2020 | Kim ................... G06N 20/00 |
| 2021/0374605 | A1 * | 12/2021 | Qian ................ G06F 21/6263 |
| 2022/0108213 | A1 * | 4/2022 | Cao .................... G06N 3/045 |

OTHER PUBLICATIONS

Abadi et al., "Deep learning with differential privacy," Proceedings of the 2016 ACM SIGSAC Conference on Computer and Communications Security, Oct. 2016, pp. 308-318.
Abadi et al., "TensorFlow: Large-scale machine learning on heterogeneous systems," Nov. 9, 2015, 19 pages.
Abowd, "The U.S. Census Bureau Adopts Differential Privacy," Proceedings of the 24th ACM SIGKDD International Conference on Knowledge Discovery & Data Mining, Jul. 2018, p. 2867.

(Continued)

*Primary Examiner* — Hal Schnee
(74) *Attorney, Agent, or Firm* — Fish & Richardson P.C.

(57) ABSTRACT

Methods, systems, and apparatus, including computer programs encoded on computer storage media, for training neural networks with label differential privacy. One of the methods includes, for each training example: processing the network input in the training example using the neural network in accordance with the values of the network parameters as of the beginning of the training iteration to generate a network output, generating a private network output for the training example from the target output in the training example and the network output for the training example, and generating a modified training example that includes the network input in the training example and the private network output for the training example; and training the neural network on at least the modified training examples to update the values of the network parameters.

20 Claims, 4 Drawing Sheets

(56) References Cited

OTHER PUBLICATIONS

Bassily et al., "Private Empirical Risk Minimization: Efficient Algorithms and Tight Error Bounds," Presented at IEEE 55th Annual Symposium on Foundations of Computer Science, Philadelphia, PA, USA, Oct. 18-21, 2014, pp. 464-473.
Beimel et al., "Private Learning and Sanitization: Pure vs. Approximate Differential Privacy," Theory of Computing, May 27, 2016, 12(890):1-61.
Blog.tensorflow.org [online]., "Introducing TensorFlow Privacy: Learning with Differential Privacy for Training Data," Mar. 6, 2019, retrieved on May 31, 2022, retrieved from URL<https://blog.tensorflow.org/2019/03/introducing-tensorflow-privacy-learning.html>, 7 pages.
Chaudhuri et al., "Differentially Private Empirical Risk Minimization," Journal of Machine Learning Research, Mar. 2011, 12(2011):1069-1109.
Chaudhuri et al., "Privacy-preserving logistic regression," Proceedings of the 21st International Conference on Neural Information Processing Systems, Dec. 2008, 8 pages.
Chaudhuri et al., "Sample Complexity Bounds for Differentially Private Learning," Proceedings of the 24th Annual Conference on Learning Theory, Jun. 2011, 19:155-186.
Chen et al., "Understanding and Utilizing Deep Neural Networks Trained with Noisy Labels," Proceedings of the 36th International Conference on Machine Learning, Jun. 2019, 9 pages.
Clanuwat et al., "Deep Learning for Classical Japanese Literature," arXiv, Dec. 3, 2018, 8 pages.
cnet.com [online], "How Google tricks itself to protect Chrome user privacy," Oct. 31, 2014, retrieved on May 31, 2022, retrieved from URL<https://www.cnet.com/tech/services-and-software/how-google-tricks-itself-to-protect-chrome-user-privacy/>, 4 pages.
De Vries et al., "Improved Regularization of Convolutional Neural Networks with Cutout," arXiv, Nov. 29, 2017, 8 pages.
Ding et al., "Collecting Telemetry Data Privately," Advances in Neural Information Processing Systems, Dec. 2017, 10 pages.
Duchi et al., "Minimax Optimal Procedures for Locally Private Estimation," Journal of the American Statistical Association, May 16, 2018, 37 pages.
Dwork et al., "Calibrating Noise to Sensitivity in Private Data Analysis," Theory of Cryptography Conference, Mar. 2006, pp. 265-284.
Dwork et al., "Our Data, Ourselves: Privacy Via Distributed Noise Generation," Annual International Conference on the Theory and Applications of Cryptographic Techniques, May 2006, pp. 486-503.
Dwork et al., "The algorithmic foundations of differential privacy," Foundations and Trends in Theoretical Computer Science, Aug. 11, 2014, 9(3-4):211-407.
Erlingsson et al., "RAPPOR: Randomized Aggregatable Privacy-Preserving Ordinal Response," Proceedings of the 2014 ACM SIGSAC Conference on Computer and Communications Security, Nov. 2014, pp. 1054-1067.
Gupta et al., "Differentially Private Combinatorial Optimization," Proceedings of the 2010 Annual ACM-SIAM Symposium on Discrete Algorithms (SODA), Oct. 11, 2009, pp. 1106-1125.
Han et al., "Co-teaching: Robust training of deep neural networks with extremely noisy labels," Advances in Neural Information Processing Systems, Dec. 2018, 11 pages.
Han et al., "SIGUA: Forgetting May Make Learning with Noisy Labels More Robust," Proceedings of the 37th International Conference on Machine Learning, Jul. 2020, 11 pages.
Harutyunyan et al., "Improving generalization by controlling label-noise information in neural network weights," Proceedings of the 37th International Conference on Machine Learning, Jul. 2020, 11 pages.
He et al., "Deep residual learning for image recognition," Proceedings of the IEEE Conference on Computer Vision and Pattern Recognition (CVPR), Jun. 2016, pp. 770-778.
Hu et al., "Simple and Effective Regularization Methods for Training on Noisily Labeled Data with Generalization Guarantee," Presented at Eighth International Conference on Learning Representations, Virtual Conference, Formerly Addis Ababa, Ethiopia, Apr. 26-May 1, 2020, 18 pages.
Jiang et al., "Beyond Synthetic Noise: Deep Learning on Controlled Noisy Labels," Proceedings of the 37th International Conference on Machine Learning, Jul. 2020, 12 pages.
Kairouz et al., "Advances and Open Problems in Federated Learning," arXiv, Dec. 10, 2019, 105 pages.
Kasiviswanathan et al., "What can we learn privately?," SIAM Journal on Computing, Jun. 23, 2011, 40(3):793-826.
Kifer et al., "Private Convex Empirical Risk Minimization and High-dimensional Regression," Proceedings of the 25th Annual Conference on Learning Theory, Jun. 2012, pp. 25.1-25.40.
Krizhevsky et al., "Learning Multiple Layers of Features From Tiny Images," Apr. 8, 2009, 60 pages.
LeCun et al., "Gradient-based learning applied to document recognition," Proceedings of the IEEE, Nov. 1998, 86(11): 2278-2324.
Lukasik et al., "Does label smoothing mitigate label noise?," Proceedings of the 37th International Conference on Machine Learning, Jul. 2020, 11 pages.
Ma et al., "Normalized Loss Functions for Deep Learning with Noisy Labels," Proceedings of the 37th International Conference on Machine Learning, Jul. 2020, 11 pages.
machinelearning.apple.com [online], "Learning with Privacy at Scale," Dec. 2017, retrieved on May 26, 2022, retrieved from URL<https://machinelearning.apple.com/research/learning-with-privacy-at-scale>, 9 pages.
McMahan et al., "Learning differentially private recurrent language models," Presented at Sixth International Conference on Learning Representations, Vancouver, Canada, Apr. 30-May 3, 2018, 14 pages.
medium.com [online], "Differential Privacy Series Part 1 | DP-SGD Algorithm Explained, " Aug. 31, 2020, retrieved on May 31, 2022, retrieved from URL<https://medium.com/pytorch/differential-privacy-series-part-1-dp-sgd-algorithm-explained-12512c3959a3>, 11 pages.
Menon et al., "Can gradient clipping mitigate label noise?," Presented at Eighth International Conference on Learning Representations, Virtual Conference, Formerly Addis Ababa, Ethiopia, Apr. 26-May 1, 2020, 27 pages.
Nguyen et al., "SELF: Learning to Filter Noisy Labels with Self-Ensembling," Presented at Eighth International Conference on Learning Representations, Virtual Conference, Formerly Addis Ababa, Ethiopia, Apr. 26-May 1, 2020, 16 pages.
Papernot et al., "Scalable private learning with PATE," Presented at Sixth International Conference on Learning Representations, Vancouver, Canada, Apr. 30-May 3, 2018, 34 pages.
Papernot et al., "Semi-supervised knowledge transfer for deep learning from private training data," Presented at Fifth International Conference on Learning Representations, Toulon, France, Apr. 24-26, 2017, 16 pages.
Papernot et al., "Tempered Sigmoid Activations for Deep Learning with Differential Privacy," arXiv, Jul. 28, 2020, 10 pages.
Pleiss et al., "Identifying Mislabeled Data using the Area Under the Margin Ranking," Proceedings of the 34th International Conference on Neural Information Processing Systems, Dec. 2020, 13 pages.
Shamir et al., "Stochastic Gradient Descent for Non-smooth Optimization: Convergence Results and Optimal Averaging Schemes," Proceedings of the 30th International Conference on Machine Learning, Jun. 2013, 9 pages.
Shokri et al., "Privacy-Preserving Deep Learning, " Proceedings of the 22nd ACM SIGSAC Conference on Computer and Communications Security, Oct. 2015, pp. 1310-1321.
Song et al., "Learning from noisy labels with deep neural networks: A survey," arXiv, Oct. 28, 2020, 14 pages.
Song et al., "Prestopping: How Does Early Stopping Help Generalization against Label Noise?," arXiv, Nov. 19, 2019, 17 pages.
Song et al., "Stochastic gradient descent with differentially private updates, " Presented at IEEE Global Conference on Signal and Information Processing, Austin, TX, USA, Dec. 3-5, 2013, pp. 245-248.

(56) References Cited

OTHER PUBLICATIONS

Steinke et al., "Between pure and approximate differential privacy," J. Priv. Confidentiality, 2016, 7(2):3-22.
Szegedy et al., "Going Deeper With Convolutions," Proceedings of the IEEE Conference on Computer Vision and Pattern Recognition (CVPR), Jun. 2015, pp. 1-9.
Wang et al., "Differentially Private Empirical Risk Minimization Revisited: Faster and More General," Advances in Neural Information Processing Systems 30, Dec. 2017, 10 pages.
Wang et al., "On Sparse Linear Regression in the Local Differential Privacy Model," Proceedings of the 36th International Conference on Machine Learning, Jun. 2019, 10 pages.
Warner., "Randomized Response: A Survey Technique for Eliminating Evasive Answer Bias," Journal of the American Statistical Association, Mar. 1965, 60(309):63-69.
web.dev [online], "A more private way to measure ad conversions, the Event Conversion Measurement API," Oct. 6, 2020, retrieved on May 26, 2022, retrieved from URL<https://master--web-dev-staging.netlify.app/conversion-measurement/>, 25 pages.
wired.com [online], "Apple's 'Differential Privacy' Is About Collecting Your Data—But Not Your Data," Jun. 13, 2016, retrieved on May 26, 2022, retrieved from URL<https://www.wired.com/2016/06/apples-differential-privacy-collecting-data/#:~: text=7%3A02%20PM-,Apple%27s%20%27Differential%20Privacy%27%20Is%20About%20Collecting%20Your%20Data%2D%2D%2DBut,about%20any%20individual%20in%20it.>, 6 pages.
Xiao et al., "Fashion-MNIST: a Novel Image Dataset for Benchmarking Machine Learning Algorithms," arXiv, Sep. 15, 2017, 6 pages.
Yu et al., "How does Disagreement Help Generalization against Label Corruption?," Proceedings of the 36th International Conference on Machine Learning, Jun. 2019, 10 pages.
Zhang et al., "Efficient Private ERM for Smooth Objectives," Proceedings of the Twenty-Sixth International Joint Conference on Artificial Intelligence, Aug. 2017, pp. 3922-3928.
Zhang et al., "Generalized Cross Entropy Loss for Training Deep Neural Networks with Noisy Labels," Advances in Neural Information Processing Systems 31, Dec. 2018, 11 pages.
Zhang et al., "mixup: Beyond empirical risk minimization," Presented at Sixth International Conference on Learning Representations, Vancouver, Canada, April 30-May 3, 2018, 13 pages.
Zheng et al., "Error-Bounded Correction of Noisy Labels," Proceedings of the 37th International Conference on Machine Learning, Jul. 2020, 11 pages.

* cited by examiner

TRAINING NEURAL NETWORKS WITH LABEL DIFFERENTIAL PRIVACY

CROSS-REFERENCE TO RELATED APPLICATION

This application claims priority to U.S. Provisional Application No. 63/105,776, filed on Oct. 26, 2020. The disclosure of the prior application is considered part of and is incorporated by reference in the disclosure of this application.

BACKGROUND

This specification relates to training neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that trains a neural network such that the trained neural network attains a target level of label differential privacy. Label differential privacy refers to maintaining the privacy of the labels for the training inputs used to train the neural network.

Particular embodiments of the subject matter described in this specification can be implemented so as to realize one or more of the following advantages.

This specification describes systems and techniques that train a neural network such that the trained neural network attains a target level of label differential privacy.

In particular, in many machine learning applications, the training data can contain highly sensitive information that should not be able to be derived from the operation of the resulting trained model. Training large-scale deep neural networks, i.e., neural networks that include multiple hidden layers, that are guaranteed not to leak sensitive information using conventional techniques has often result in trained models that compromise their accuracy on the machine learning task.

Using the described techniques, on the other hand, the neural network can be trained to attain a target level of label differential privacy without significant degradation of the performance of the trained neural network on the machine learning task relative to trained neural networks that do not attain this target level.

In particular, the described techniques are particularly applicable where the labels for the training examples are considered sensitive and need to be protected, while the points, i.e., the network inputs in the training examples, are not sensitive. The described techniques can then be used to train the neural network such that the individual label associated with any individual network input in the data set cannot be recovered from the trained neural network, i.e., so that the trained neural network has a target level of differential privacy with respect to the labels.

This allows the described techniques to be used in any of a large number of industrial, real-world settings that fall under this umbrella. Examples include: (i) image processing tasks where the images are not sensitive but the labels assigned to the images are sensitive, (ii) text processing tasks like text completion tasks where the initial portion of text that is provided as input to the network is not sensitive but the completions in the training examples are sensitive, (iii) recommendation tasks where the choices, i.e., the possible recommendations that can be made to the user, are known, e.g., to a streaming service provider, but the user ratings are considered sensitive, and (iv) computational advertising tasks where the impressions are known to the ad serving mechanism, and thus considered non-sensitive, while the conversions reveal user interest and are thus private.

Moreover, by using the techniques described above to modify the target outputs in the training examples to be private target outputs, the system can use an underlying training algorithm that does not need to be differentially private while still ensuring label differential privacy. This allows the system to use state of the art training algorithms that are appropriate for any given machine learning task to maintain the quality of the trained model.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
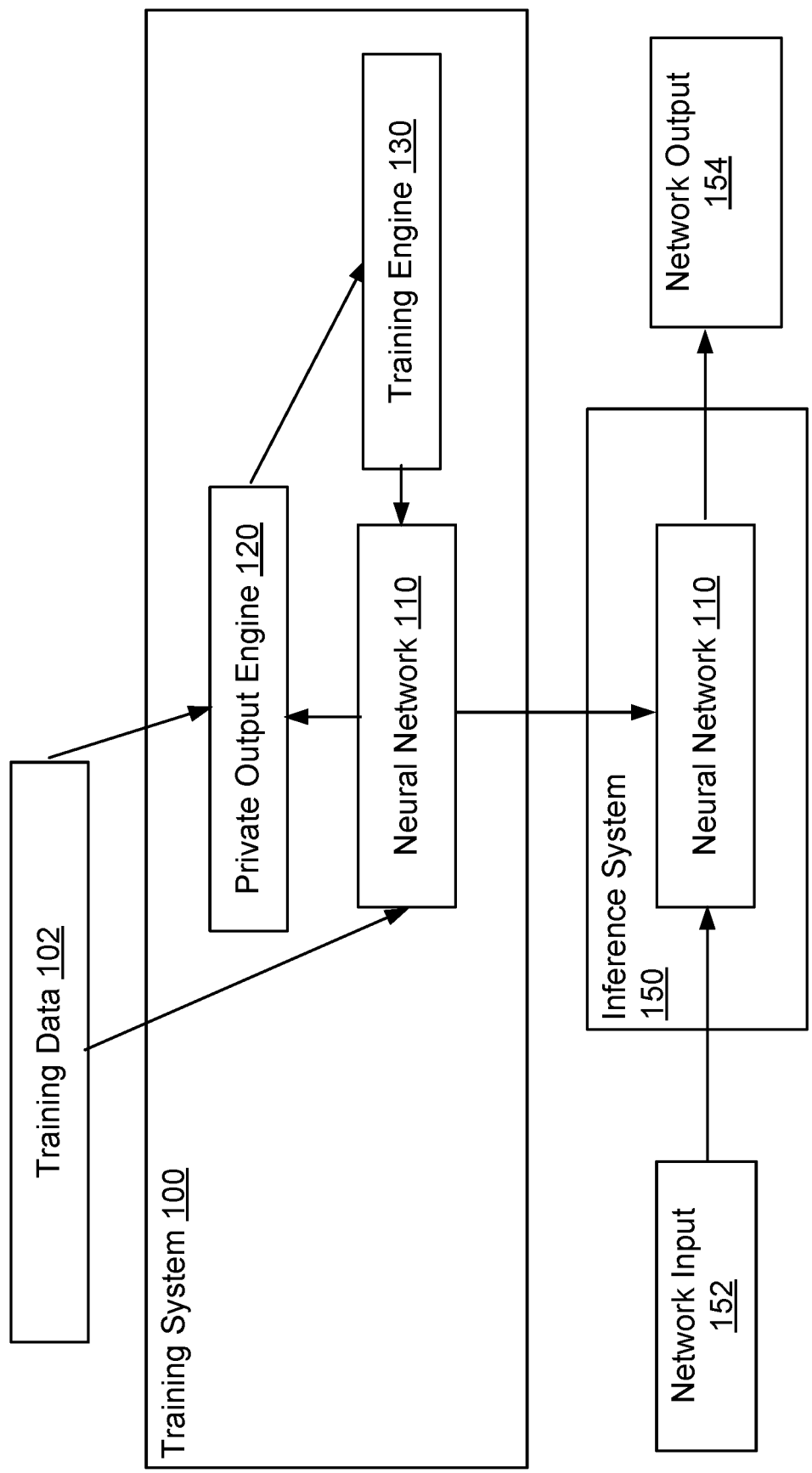
FIG. 1 shows an example training system.

FIG. 1 shows an example training system 100.

The training system 100 is an example of a system implemented as computer programs on one or more computers in one or more locations, in which the systems, components, and techniques described below can be implemented.

The training system 100 trains a neural network 110 on training data 102 to perform a machine learning task.

The neural network 110 can be trained to perform any kind of machine learning task, i.e., can be configured to receive any kind of digital data input and to generate any kind of score, classification, or regression output based on the input.

In some cases, the neural network 110 is a neural network that is configured to perform an image processing task, i.e., receive an input image and to process the input image to generate a network output for the input image. For example, the task may be image classification and the output generated by the neural network for a given image may be scores for each of a set of object categories, with each score representing an estimated likelihood that the image contains an image of an object belonging to the category. As another example, the task can be image embedding generation and the output generated by the neural network can be a numeric embedding of the input image. As yet another example, the task can be object detection and the output generated by the neural network can identify locations in the input image at which particular types of objects are depicted. As yet another example, the task can be image segmentation and the output generated by the neural network can assign each pixel of the input image to a category from a set of categories.

As another example, if the inputs to the neural network 110 are Internet resources (e.g., web pages), documents, or portions of documents or features extracted from Internet resources, documents, or portions of documents, the task can be to classify the resource or document, i.e., the output generated by the neural network for a given Internet resource, document, or portion of a document may be a score for each of a set of topics, with each score representing an estimated likelihood that the Internet resource, document, or document portion is about the topic.

As another example, if the inputs to the neural network 110 are features of an impression context for a particular advertisement, the output generated by the neural network may be a score that represents an estimated likelihood that a user will have a specified interaction with the particular advertisement, e.g., the likelihood that the advertisement will be clicked on, the likelihood that a conversion will occur after the advertisement is presented, and so on.

As another example, if the inputs to the neural network 110 are features of a personalized recommendation for a user, e.g., features characterizing the context for the recommendation, e.g., features characterizing previous actions taken by the user, the output generated by the neural network may be a score for each of a set of content items, e.g., videos, software applications, books, images, and so on, with each score representing an estimated likelihood that the user will respond favorably to being recommended the content item. As another example, the inputs to the neural network may be features of the personalized recommendation and features of a candidate content item and the neural network can output a single score representing the estimated likelihood that the user will respond favorably to being recommended the candidate content item.

As another example, if the input to the neural network 110 is a sequence of text in one language, the output generated by the neural network may be a score for each of a set of pieces of text in another language, with each score representing an estimated likelihood that the piece of text in the other language is a proper translation of the input text into the other language.

As another example, the task may be an audio processing task. For example, if the input to the neural network 110 is a sequence representing a spoken utterance, the output generated by the neural network may be a score for each of a set of pieces of text, each score representing an estimated likelihood that the piece of text is the correct transcript for the utterance. As another example, the task may be a keyword spotting task where, if the input to the neural network is a sequence representing a spoken utterance, the output generated by the neural network can indicate whether a particular word or phrase ("hotword") was spoken in the utterance. As another example, if the input to the neural network is a sequence representing a spoken utterance, the output generated by the neural network can identify the natural language in which the utterance was spoken.

As another example, the task can be a natural language processing or understanding task, e.g., an entailment task, a paraphrase task, a textual similarity task, a sentiment task, a sentence completion task, a grammaticality task, and so on, that operates on a sequence of text in some natural language.

As another example, the task can be a text to speech task, where the input is text in a natural language or features of text in a natural language and the network output is a spectrogram or other data defining audio of the text being spoken in the natural language.

As another example, the task can be a health prediction task, where the input is electronic health record data for a patient and the output is a prediction that is relevant to the future health of the patient, e.g., a predicted treatment that should be prescribed to the patient, the likelihood that an adverse health event will occur to the patient, or a predicted diagnosis for the patient.

As another example, the task can be an agent control task, where the input is an observation characterizing the state of an environment and the output defines an action to be performed by the agent in response to the observation. The agent can be, e.g., a real-world or simulated robot, a control system for an industrial facility, or a control system that controls a different kind of agent.

Thus, as described above, the neural network 110 is configured to process a network input to generate a network output for the machine learning task, e.g., a regression output that includes one or more regressed values for regression tasks or a classification output that includes a respective score for each of multiple categories for classification tasks.

The neural network 110 can have any appropriate architecture that allows the neural network 110 to map a network input to a network output for the machine learning task.

As one example, when the inputs are images, the neural network 110 can be a convolutional neural network, e.g., a neural network having a ResNet architecture, an Inception architecture, an EfficientNet architecture, and so on, or a Transformer neural network, e.g., a vision Transformer.

As another example, when the inputs are text, features of medical records, or other sequential data, the neural network 110 can be a recurrent neural network, e.g., a long short-term memory (LSTM) or gated recurrent unit (GRU) based neural network, or a Transformer neural network.

Once the neural network 110 has been trained, the system 100 or a different inference system 150 uses the trained neural network 110 to perform inference, i.e., to receive a new network input 152 and to process the new network input 152 using the trained neural network 110 to generate a network output 154 for the machine learning task.

The training data 102 includes multiple training examples. Each training example in the training data 102 includes a network input and a target output for the network input.

When the neural network 110 is configured to perform a regression task that requires regression outputs, i.e., outputs that include one or more regressed values, each target output includes a target regression output for the corresponding training example.

When the neural network 110 is configured to perform a classification task, each target output is a label that identifies an actual class for the corresponding network input, i.e., the class that the corresponding network input has already been classified into. For example, the label can be a one-hot vector that has a respective entry corresponding to each of class, with the entry corresponding to the actual class being one and all other entries being zero.

In particular, the system 100 trains the neural network 110 such that the trained neural network attains a target level of label differential privacy.

At a high level, training the neural network 110 to be label differentially private refers to, given a set of training data, training the neural network 110 so that the neural network 110 generates approximately the same network outputs after training if the target output for any given training example in the training data is changed to a different target output.

More specifically, the level of label differential privacy represents the maximum allowable difference between the network outputs generated by the trained neural network 110 given a change in the target output for any single training example in the training data 102. The target level of label differential privacy is represented as a real number and is received as input by the system 100 from a user.

That is, the system 100 trains the neural network 110 such that, for any two neighboring sets of training data D and D', and for all subsets S of possible network outputs generated by the neural network 110:

$$Pr[f(D)\in S] \geq e^\epsilon \cdot Pr[f(D')\in S],$$

where two sets of training data are neighboring if they are the same except that the target output for a single training example is different, "Pr" refers to the probability, f(D) are the outputs of a neural network trained on the set of training data D, e.g., as measured on the training set or on a held out set, and ε is the target level of differential privacy.

To perform the training, the system 100 performs a sequence of training iterations to repeatedly update the values of the parameters of the neural network ("network parameters").

In some implementations, prior to performing the sequence of training iterations, the system 100 can perform an initial training iteration in order to perform an initial update of the network parameters, i.e., from initial values that have been initialized using any conventional neural network parameter initialization technique.

In some other implementations, prior to performing the sequence of training iterations, the system 100 pre-trains the neural network on non-sensitive data, e.g., a publically available data set or a synthetic data set, using conventional training techniques to determine the values of the network parameters that will be used for the first iteration of the plurality of iterations.

To perform a training iteration, the system 100 obtains a plurality of training examples for the training iteration from the training data 102.

For each training example, the system 100 processes the network input in the training example using the neural network 110 in accordance with the values of the network parameters, i.e., the values as of the beginning of the training iteration, to generate a network output.

A private output engine 120 within the system 100 then generates a private network output for the training example from the target output in the training example and the network output for the training example and generates a modified training example that includes the network input in the training example and the private network output for the training example, i.e., instead of the target output for the training example that was in the original training example.

A training engine 130 within the system 100 then trains the neural network 110 on at least the modified training examples to update the values of the network parameters.

Thus, at each iteration, the system 100 uses the trained neural network 110 as of that iteration to improve the quality of the private network outputs. This allows the system 100 to train the neural network 110 to have the target level of label differential privacy while still having high performance on the machine learning task.

Training the neural network 110 is described in more detail below with reference to FIGS. 2-4.

In some implementations, the described techniques can be used in a federated learning framework, where different training iterations are performed on different user computers, e.g., mobile devices. In federated learning, for each training iteration, the user computer assigned to the training iteration downloads the current neural network, i.e., downloads the current values of the network parameters as of the iteration from one or more central servers, and performs the training iteration on training examples that are available locally on the user computer. The user computer then sends data defining the updated values of the network parameters to the central servers, e.g., as an encrypted update. Thus, the training examples available to different user computers are never provided to or known to the central servers or to the other user computers.

Figure 2:
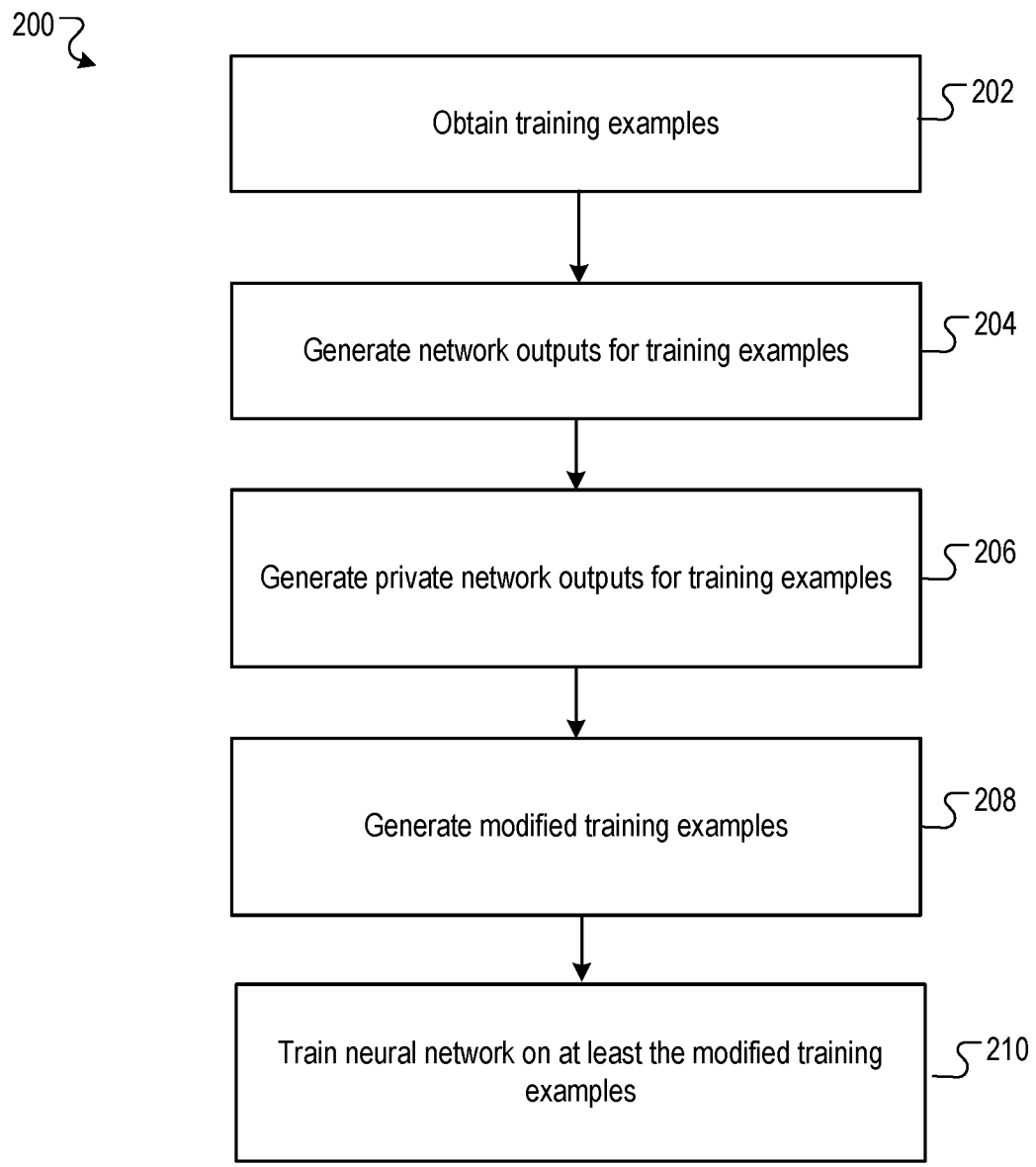
FIG. 2 is a flow diagram of an example process for training a neural network.

FIG. 2 is a flow diagram of an example process 200 for training a neural network. For convenience, the process 200 will be described as being performed by a system of one or more computers located in one or more locations. For example, a training system, e.g., the training system 100 of FIG. 1, appropriately programmed in accordance with this specification, can perform the process 200.

The system can repeatedly perform multiple training iterations, i.e., multiple iterations of the process 200, to train the neural network, i.e., to determine trained values of the network parameters of the neural network.

In other words, the system performs a sequence of training iterations, i.e., iterations of the process 200, to repeatedly update the values of the network parameters.

In some implementations, prior to performing the sequence of training iterations, the system can perform an initial training iteration in order to perform an initial update of the network parameters, i.e., from initial values that have been initialized using any conventional neural network parameter initialization technique.

In some other implementations, prior to performing the sequence of training iterations, the system pre-trains the neural network on non-sensitive data, e.g., a publically available data set or a synthetic data set, using conventional training techniques to determine the values of the network parameters that will be used for the first iteration of the sequence of iterations.

The system obtains a plurality of training examples for the training iteration (step 202). For example, at each iteration, the system can sample a fixed number of training examples from a larger set of training data or can randomly partition the training data into a fixed number of partitions and use a different partition for each training iteration.

For each training example, the system processes the network input in the training example using the neural network in accordance with the values of the network parameters as of the current training iteration, i.e., the values as of the beginning of the training iteration, to generate a network output for the training example (step 204). That is, the system uses the current neural network at the end of the previous training iteration to generate the network output for the training example.

If performing the initial training iteration, the system can use a default network output, e.g., an output that assigns an equal probability to all of the classes for classification tasks, in place of the network output and modifies each training example using the default network output as described below.

For each training example, the system generates a private network output for the training example from the target output in the training example and the network output for the training example (step 206).

By generating a private network output as described in this specification, the system ensures that the resulting trained neural network will satisfy the target level of differential privacy.

Generating the private network output will be described below with reference to FIGS. 3 and 4.

For each training example, the system generates a modified training example that includes the network input in the training example and the private network output for the training example, i.e., instead of the target output for the training example that was in the original training example (step 208). That is, the modified training example replaces the target output in the original training example with the private network output.

The system trains the neural network on at least the modified training examples to update the values of the network parameters (step 210).

Generally, the system can train the neural network on the modified training examples using any appropriate training algorithm, i.e., the system can perform the training using a training algorithm that is not differentially private.

As a particular example, the system can train the neural network to minimize a loss function, e.g., a cross-entropy loss function or other appropriate loss function for the machine learning task, using any appropriate gradient-descent based technique, e.g., Adam, rmsProp, Adafactor, stochastic gradient descent (SGD), and so on.

That is, the system trains the neural network on at least the modified training examples using gradient descent with backpropagation to minimize the loss function for a machine learning task.

As another particular example, the system can use a modified gradient descent based technique. In this modified technique, when training on a given modified training example, the system computes, like in the above techniques, a gradient vector with respect to the network parameters of a loss function for machine learning task. However, instead of directly updating the values of the network parameters using the gradient vector, the system instead generates a modified gradient vector by adding a Gaussian noise vector to the gradient vector that has nonzero variance only in a K-dimensional subspace corresponding to the K total classes in the plurality of classes and then updates the values of the network parameters using the modified gradient vector.

In some cases, the system trains the neural network from scratch at each iteration of the process 200. That is, the system performs the training of step 210 starting from initial values of the network parameters, e.g., parameter values that have been initialized using an appropriate initialization technique.

In some other cases, the system performs the training of step 210 starting from the values of the network parameters as of the beginning of the training iteration, i.e., starting from the values of the network parameters at the end of the preceding training iteration.

In some implementations, the system uses only the modified training examples for the current training iteration when performing the training in step 210. In some other implementations, the system trains the neural network on the modified training examples for the current training iteration and the modified training examples from each already performed training iteration, i.e., so that the neural network is trained on more training examples at each subsequent training iteration.

Figure 3:
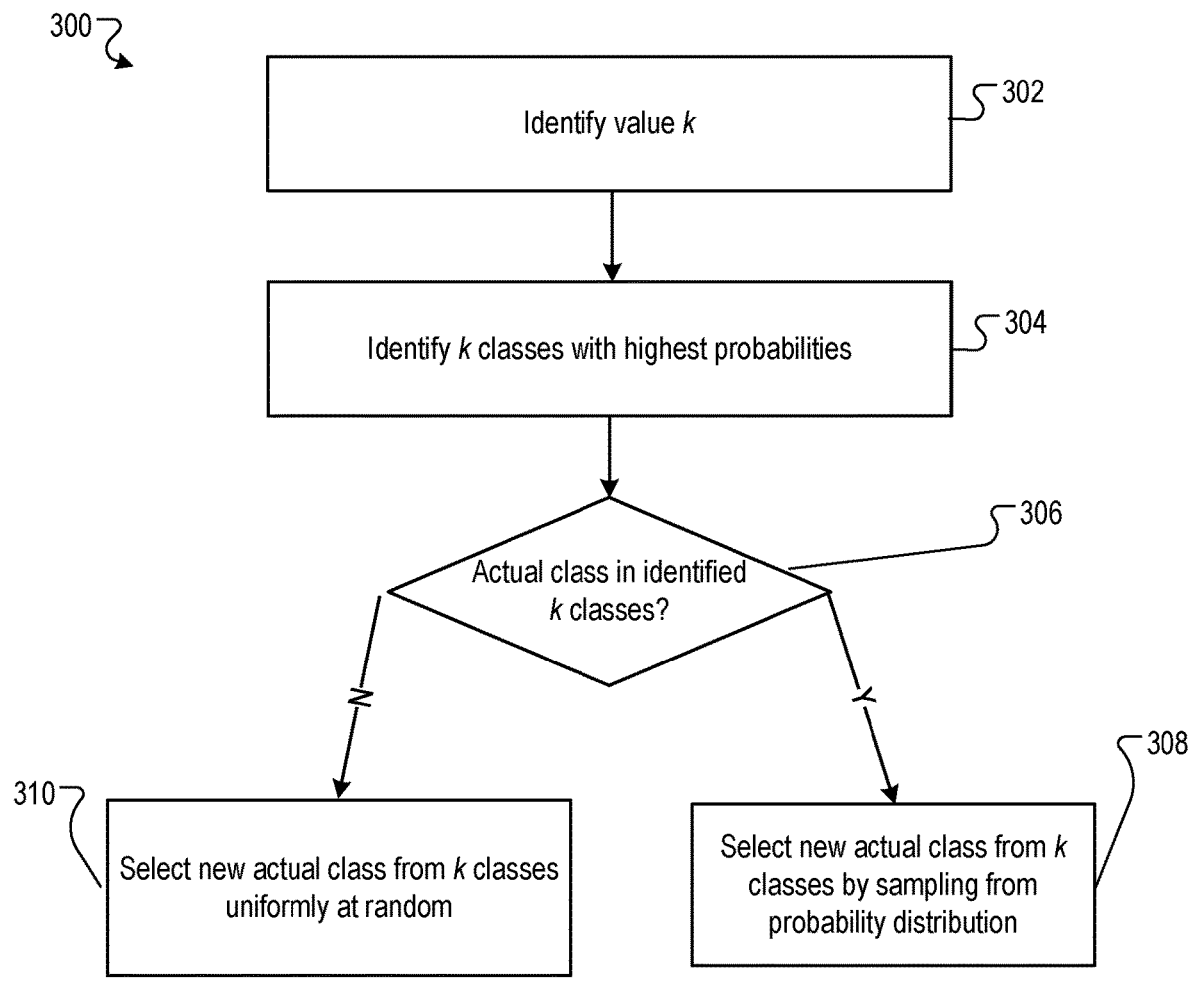
FIG. 3 is a flow diagram of an example process for generating a private network output for a training example.

FIG. 3 is a flow diagram of an example process 300 for generating a private target output from a training example. For convenience, the process 300 will be described as being performed by a system of one or more computers located in one or more locations. For example, an inference system, e.g., the inference system 100 of FIG. 1, appropriately programmed in accordance with this specification, can perform the process 300.

In particular, the process 300 describes how to generate a private target output for a training example when the neural network is configured to perform a classification task, i.e., when the neural network is configured to generate network outputs that each include a respective probability for each of a plurality of classes and the target output in each training example is a label that identifies an actual class for the network input in the training example. Generally, to generate the private target output, the system determines a new actual class that will be identified as the actual class by the private target output.

The system identifies a value k for the training example (step 302).

In some implementations, k is equal to the total number of classes in the plurality of classes.

In some other implementations, the value of k is equal to a positive integer than is less than the total number of classes in the plurality of classes. In some of these implementations, the value of k is fixed and is the same for all training examples. In others of these implementations, the system determines the value of k for each training example based on the label for the training example and the network output for the training example. Determining the value of k is described below with reference to FIG. 4.

The system identifies the k classes from the plurality of classes that have the highest probabilities according to the network output for the training example (step 304).

The system determines whether the actual class identified by the target output in the training example is one of the identified k classes (step 306). That is, the system determines whether the actual class for the training example is one of the k classes with highest probabilities.

When the actual class identified by the target output in the training example is one of the identified k classes, the system selects, as the new actual class identified by the private target output, one of the identified k classes by sampling from a probability distribution (step 308).

The probability distribution assigns a first probability to the actual class identified by the target output and assigns a different, second probability to each class in the identified k classes other than the actual class identified by the target output. Generally, the first and second probabilities are based on the target level $\varepsilon$ of differential label privacy to be reached by the trained neural network and the value of k. The target level $\varepsilon$ can be represented as a real number and can be received as an input by the system from a user.

As a particular example, the first probability assigned to the actual class can be equal to $$\frac{e^\varepsilon}{e^\varepsilon + k - 1}$$

and the second probability assigned to each class in the identified k classes other than the actual class can be equal to $$\frac{1}{e^\varepsilon + k - 1}.$$

When the actual class identified by the target output in the training example is not one of the identified k classes, the system selects, as the new actual class identified by the private target output, one of the identified k classes uniformly at random (step 310).

Thus, the private network output identifies as the actual class for the training example one of the identified k classes, but the manner in which the system selects one of the k classes depends on whether the actual class identified by the target output in the training example is one of the k classes. By selecting the private network output in this manner, the system uses the "current" neural network to "improve" the generation of the private output in order to guarantee the desired level of privacy while maintaining high quality performance on the machine learning task.

Figure 4:
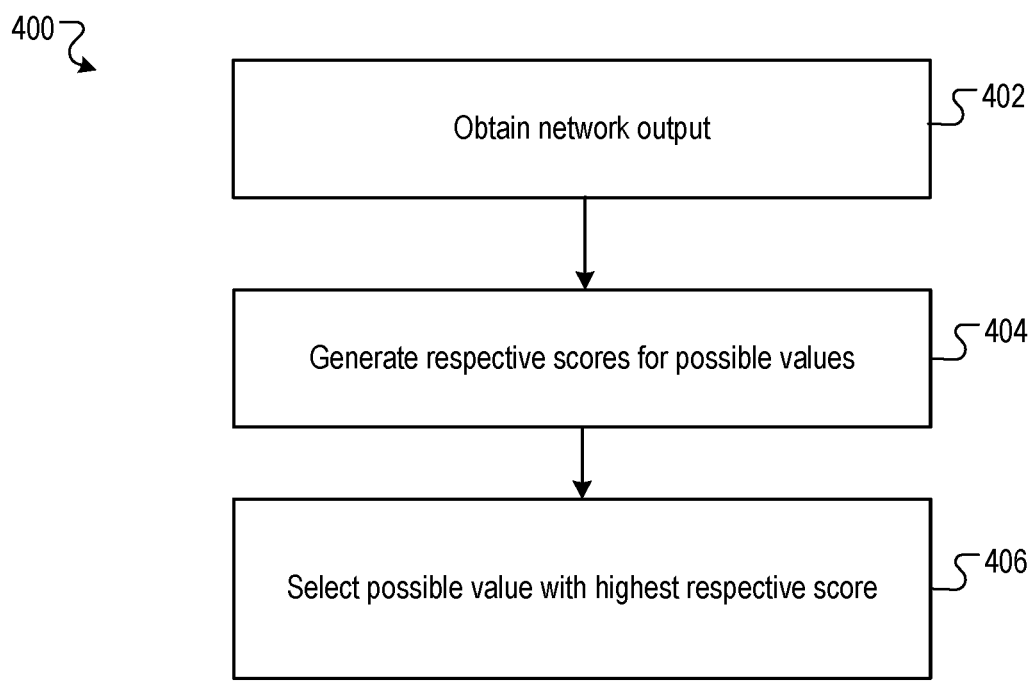
FIG. 4 is a flow diagram of an example process for determining a value of k for a training example.

FIG. 4 is a flow diagram of an example process 400 for determining the value of k for a training example. For convenience, the process 400 will be described as being performed by a system of one or more computers located in one or more locations. For example, an inference system, e.g., the inference system 100 of FIG. 1, appropriately programmed in accordance with this specification, can perform the process 400.

The system obtains the network output for the training example (step 402), i.e., that is generated as described above with reference to step 204.

The system computes a respective score for each of a plurality of possible values of k (step 404) using the network output. For example, the possible values for k can be each integer in the range of 1 to K, inclusive, where K is the total number of classes in the plurality of classes for which the network output includes scores.

More specifically, to compute the respective score for a given possible value, the system computes a weight for the possible value from (i) the possible value and (ii) the target level ε of differential label privacy to be reached by the trained neural network.

In particular, the weight can be equal to:

$$\frac{e^{\varepsilon}}{e^{\varepsilon} + k - 1}$$

The system also computes a sum of the probabilities assigned by the network output to the j classes having the highest probabilities according to the network output, where j is equal to the possible value. For example, if the possible value is equal to 3, the system computes the sum of the 3 highest probabilities in the network output.

The system then computes the respective score for the given possible value based on, e.g., by setting score equal to, a product of the weight and the sum.

The system selects, as the value of k, the possible value that has the highest respective score (step 406).

Selecting the value of k in this manner allows the system to select different values of k for different training examples in order to optimize the performance of the training process, i.e., to select the value of k dynamically to account for the fact that larger values of k increase privacy, but can decrease the accuracy of the trained model.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A method for training a neural network having a plurality of network parameters by performing a sequence of training iterations to repeatedly update values of the plurality of network parameters, the method comprising, at each training iteration in the sequence of training iterations:
    obtaining a plurality of training examples for the training iteration, each training example comprising a network input and a target output for the network input;
    for each training example:
        processing the network input in the training example using the neural network in accordance with the values of the network parameters as of the beginning of the training iteration to generate a network output,
        generating a private network output for the training example from the target output in the training example and the network output for the training example, and
        generating a modified training example that includes the network input in the training example and the private network output for the training example; and
    training the neural network on at least the modified training examples to update the values of the network parameters.

2. The method of claim 1, further comprising, at an initial training iteration that is performed before a first training iteration in the sequence of training iterations;
    obtaining initial values of the network parameters;
    obtaining a plurality of initial training examples for the initial training iteration, each initial training example comprising a network input and a target output for the network input;
    obtaining a default network output;
    for each initial training example in the plurality of initial training examples for the initial training iteration:
        generating a private network output for the initial training example from the target output in the initial training example and the default network output, and
        generating a modified initial training example that includes the network input in the initial training example and the private network output for the training example; and
    training the neural network on the modified initial training examples to update the initial values of the network parameters.

3. The method of claim 2, wherein obtaining initial values of the network parameters comprises initializing the values of the network parameters using a neural network parameter initialization technique.

4. The method of claim 1, wherein training the neural network on at least the modified training examples to update the values of the network parameters comprises:
    training the neural network on at least the modified training examples for the training iteration and the modified training examples for any training iteration that is before the training iteration in the sequence of training iterations to update the values of the network parameters.

5. The method of claim 1, wherein training the neural network on at least the modified training examples to update the values of the network parameters comprises:
    training the neural network starting from initial values of the network parameters.

6. The method of claim 1, wherein training the neural network on at least the modified training examples to update the values of the network parameters comprises:
    training the neural network starting from the values of the network parameters at the beginning of the training iteration.

7. The method of claim 1, wherein the neural network is configured to generate network outputs that are regression outputs that each comprise one or more regressed values, and wherein the target output in each training example is an actual regression output for the network input in the training example.

8. The method of claim 1, wherein the neural network is configured to generate network outputs that each comprise a respective probability for each of a plurality of classes and wherein the target output in each training example is a label that identifies an actual class for the network input in the training example.

9. The method of claim 8, wherein generating a private network output for the training example from the target output in the training example and the network output for the network input comprises:
    identifying k classes from the plurality of classes having the highest probabilities according to the network output for the training example; and
    when the actual class identified by the target output in the training example is one of the identified k classes:
        selecting, as a class identified by the private target output, one of the identified k classes by sampling from a probability distribution that:
            assigns a first probability to the actual class identified by the target output with a first probability, and
            assigns a different, second probability to each class in the identified k classes other than the actual class identified by the target output.

10. The method of claim 9, wherein the first and second probabilities are based on a target level of differential label privacy to be reached by the trained neural network and the value of k.

11. The method of claim 9, wherein the value of k is equal to a total number of classes in the plurality of classes.

12. The method of claim 9, wherein the value of k is equal to an integer than is less than a total number of classes in the plurality of classes.

13. The method of claim 12, wherein the value of k is the same for each of the training examples.

14. The method of claim 12, further comprising, selecting the value of k for the training example by:
    computing, for each of a plurality of possible values for k, a respective score using the network output for the training example; and
    selecting, as the value of k, the possible value of k having the highest respective score.

15. The method of claim 14, wherein computing, for each of a plurality of possible values for k, a respective score using the network output for the training example comprises:

computing a weight for the possible value of k from (i) the possible value of k and (ii) a target level of differential label privacy to be reached by the trained neural network;

computing a sum of the probabilities assigned by the network output to j classes having the highest probabilities according to the network output for the training example, wherein j is equal to the possible value of k; and determining the respective score based on a product of the weight and the sum.

16. The method of claim 12, wherein generating a private network output for the training example from the target output in the training example and the network output for the network input further comprises:

when the actual class identified by the target output in the training example is not one of the identified k classes:
selecting, as the class identified by the private target output, one of the identified k classes uniformly at random.

17. The method of claim 1, wherein training the neural network on at least the modified training examples to update the values of the network parameters comprises:

training the neural network on at least the modified training examples using gradient descent with backpropagation to minimize a loss function for a machine learning task.

18. The method of claim 1, wherein the neural network is configured to generate network outputs that each comprise a respective probability for each of a plurality of classes and wherein the target output in each training example is a label that identifies an actual class for the network input in the training example, and wherein training the neural network on at least the modified training examples to update the values of the network parameters comprises:

determining, for each of the modified training examples, a gradient vector with respect to the network parameters of a loss function for machine learning task;

generating, for each of the modified training examples, a modified gradient vector by adding a Gaussian noise vector to the gradient vector that has nonzero variance only in a K-dimensional subspace corresponding to a total number of classes K in the plurality of classes; and updating the values of the network parameters using the modified gradient vectors.

19. One or more non-transitory computer-readable storage media storing instructions that when executed by one or more computers cause the one or more computers to perform operations for training a neural network having a plurality of network parameters by performing a sequence of training iterations to repeatedly update values of the plurality of network parameters, the operations comprising, at each training iteration in the sequence of training iterations:

obtaining a plurality of training examples for the training iteration, each training example comprising a network input and a target output for the network input;

for each training example:
processing the network input in the training example using the neural network in accordance with the values of the network parameters as of the beginning of the training iteration to generate a network output, generating a private network output for the training example from the target output in the training example and the network output for the training example, and generating a modified training example that includes the network input in the training example and the private network output for the training example; and training the neural network on at least the modified training examples to update the values of the network parameters.

20. A system comprising one or more computers and one or more storage devices storing instructions that when executed by the one or more computers cause the one or more computers to perform operations for training a neural network having a plurality of network parameters by performing a sequence of training iterations to repeatedly update values of the plurality of network parameters, the operations comprising, at each training iteration in the sequence of training iterations:

obtaining a plurality of training examples for the training iteration, each training example comprising a network input and a target output for the network input;

for each training example:
processing the network input in the training example using the neural network in accordance with the values of the network parameters as of the beginning of the training iteration to generate a network output, generating a private network output for the training example from the target output in the training example and the network output for the training example, and generating a modified training example that includes the network input in the training example and the private network output for the training example; and training the neural network on at least the modified training examples to update the values of the network parameters.

* * * * *